(12) United States Patent
Viskochil

(10) Patent No.: US 8,331,059 B2
(45) Date of Patent: Dec. 11, 2012

(54) SUB-ASSEMBLY FOR A HARD DISC DRIVE

(75) Inventor: Stephen Ralph Viskochil, Los Gatos, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 560 days.

(21) Appl. No.: 12/454,589

(22) Filed: May 20, 2009

(65) Prior Publication Data

US 2010/0296198 A1     Nov. 25, 2010

(51) Int. Cl.
*G11B 21/22* (2006.01)
(52) U.S. Cl. .......... 360/254.7; 360/256.4; 360/254.3
(58) Field of Classification Search .......... 369/254.7, 369/256.4, 254, 256.2; 360/254.7, 256.4, 360/254, 256.2, 254.3, 254.5
See application file for complete search history.

(56) References Cited

U.S. PATENT DOCUMENTS

| 4,890,174 | A | 12/1989 | Chalmers et al. |
| 6,069,766 | A | 5/2000 | Battu et al. |
| 6,215,628 | B1 * | 4/2001 | Boutaghou ............ 360/256.4 |
| 6,636,380 | B2 | 10/2003 | Goeke et al. |
| 7,133,248 | B2 | 11/2006 | Shin et al. |

* cited by examiner

*Primary Examiner* — Huan Hoang
(74) *Attorney, Agent, or Firm* — Saile Ackerman LLC; Stephen B. Ackerman

(57) ABSTRACT

A bracket for a hard disc drive combining three separate functions, a ramp, a latch and a connector bracket into a single assembly. The bracket assembly, mounted with ramp and latch, secures and seals the electrical connector connecting the flexible printed circuit on the head side of the actuator. Traditionally, latches are on the coil side of the actuator. Moreover, the combination bracket improves manufacturability while reducing overall cost for the disc drive. The assembly can be purchased complete from a supplier.

21 Claims, 5 Drawing Sheets

SUB-ASSEMBLY FOR A HARD DISC DRIVE

BACKGROUND OF THE INVENTION (1) Technical Field

The present invention relates generally to hard disc drives (HDD), and more particularly to an improvement combining three separate HDD operations into a single assembly.

(2) Description of the Prior Art

Present-day mass produced hard disc drives consists of a metallic housing in which is contained one or more discs (platters) mounted on a spindle that allows the discs to rotate. The discs are made from a solid, non-magnetic material, normally aluminum or glass. The discs are coated, on each side, with a very thin layer of magnetic material into which information is stored in binary form. For both sides of each disc there is a read/write head mounted on a suspension arm that moves across the surfaces of each disc.

Typically, HDDs employ a rotary actuator structure to position the suspension arm(s) transducer heads relative to recording surfaces of rotating discs. The discs are spun at high speed that spins the air creating an "air bearing effect" on the disc surface enabling an aerodynamically shaped read/write head to "float" at a very controlled gap from the magnetic surface of the platter. This gap is extremely small, measuring less than the diameter of a human hair. Assembly of many precision made mechanical parts along with the construction of hard discs is done in a clean room and humidity-controlled environment to prevent contamination that may cause very serious damage to the hard disc.

For the past several years, data storage methods have followed a tendency of escalating storage capacity while also shrinking the physical size occupied by its storage capacities. Introduction of more powerful computer hardware and software has contributed to increasing market pressures for less expensive, larger capacity and smaller packaging in disc drives. Storage device manufacturers make every effort to achieve any possible incremental cost savings that can be reasonably achieved without loss of technical performance and reliability.

HDDs, of the prior art, using a ramp, involve a mechanism which moves the sliders off the discs prior to power-down, and safely positions them onto a cam-like structure. The cam is equipped with a shallow ramp on the side closest to the disc, giving ramp load/unload its name. During a power-on sequence, the read/write heads are loaded by moving the sliders off the ramp, and over the disc surfaces when the discs reach the appropriate rotational speed. The air current from the rotating disc acts like an air cushion between the sliders and discs, keeping the two surfaces separated by a designed distance, called the flying height.

Conventionally, installed ramps are on the base of the metallic housing. The ramp either slides or rotates into position over the surfaces of each disc. This action requires a precision-machined reference surface, a locating stop and a securing feature in the base. Additionally, HDDs using a latch to prevent the read/write heads from moving onto platter surfaces during shipping or non-operating situations, are installed on the base keeping the actuator in a secure position in the event of inappropriate handling. This also requires a precise machined mounting surface, locating stop and a securing feature on the base. Lastly, a flexible printed circuit (FPC) used to transfer data from a read/write head to a printed circuit board (PCB). A connector is used to electrically join the PCB that is mounted outside the sealed disc drive to the FPC which is attached to the read/write heads inside the sealed disc drive. A gasket provided to seal the connector, and a bracket to locate and compress the gasket. This also requires a precise machined mounting surface, locating features and a securing feature in the base. Conventionally, the ramp, latch and connector bracket are three separate members attached and positioned independently onto the base structure.

SUMMARY OF THE INVENTION

An apparatus and method applicable therein for improving assembly time, cost and space for a hard disc drive. An object of the present invention is to provide a connector bracket having an appended ramp and latch.

Another object of the invention is to provide a latch mechanism that operates on the head side as opposed to the coil side of the actuator.

Still another object of the invention is to provide mounting, locating features and stops within the connector bracket thereto eliminating needless machining that is needed for conventional methods.

Yet another object of the invention is to reduce the disc drive assembly time and cost by providing a subassembly containing the previously mentioned ramp, latch and connector bracket components, each exactly positioned relative to the read/write heads and platter surfaces.

The present invention combines three independent functions, namely, the ramp, latch, and connector bracket, into a single assembly. It is therefore a further object of the present invention to provide an improved method for the manufacture of a hard disc drive is made with fewer parts while reducing the total manufacturing cost by simplifying the assembly operation. Moreover, the present invention reduces tolerances in the disc drive assembly while improving drive reliability and robustness. The parts and assembly costs for a magnetic disc drive represents a significant portion of the total cost of the drive apparatus.

A novel application of geometric and kinematics design principles are at the center of the present invention. Applying these, principles while integrating parts serve the assembly and improve reliability for the hard disc drive. The design principles provide the full natural tolerance and constraint for the assembly of parts.

The foregoing, together with other object features and advantages of this invention, can be better appreciated with reference to the following specification, claims, and the accompanying drawings.

DETAILED DESCRIPTION OF THE PREFERRED EMBODIMENT

Figure 1:
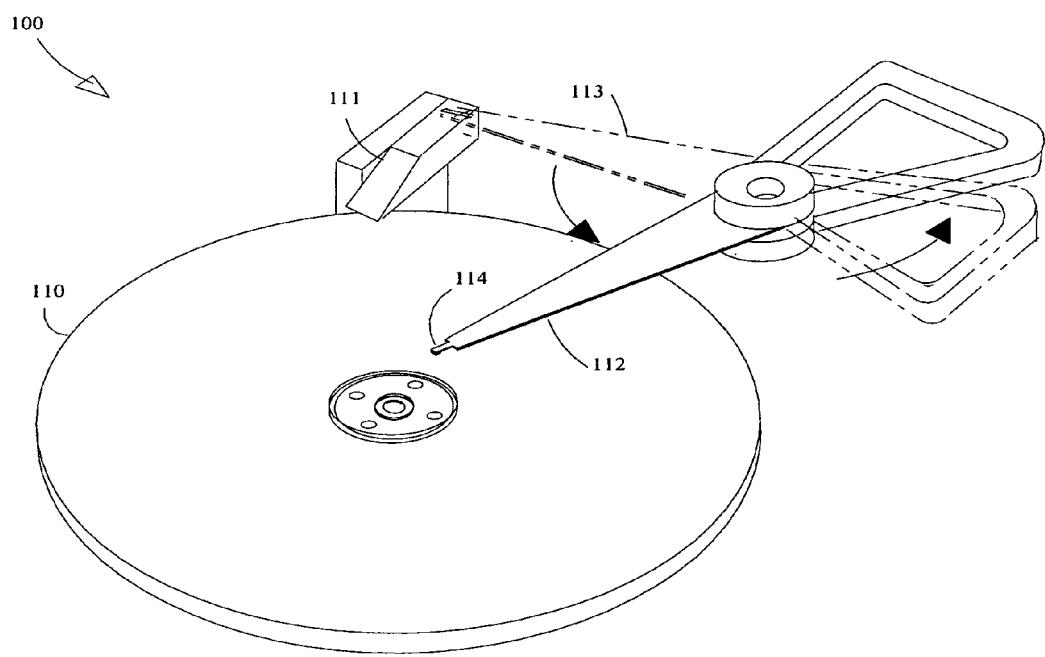
FIG. 1 is a schematic of a hard disc drive showing a ramp of the prior art.

FIG. 1 illustrates a schematic of a ramp 111 for a hard disk drive 100, of the prior art, with a suspension head slider in a park position 113. The suspension head rotates into a read/write mode 112 as the rotating disc 110 provides an air bearing effect as the read/write head slider 114 floats over the disc surface.

Figure 2:
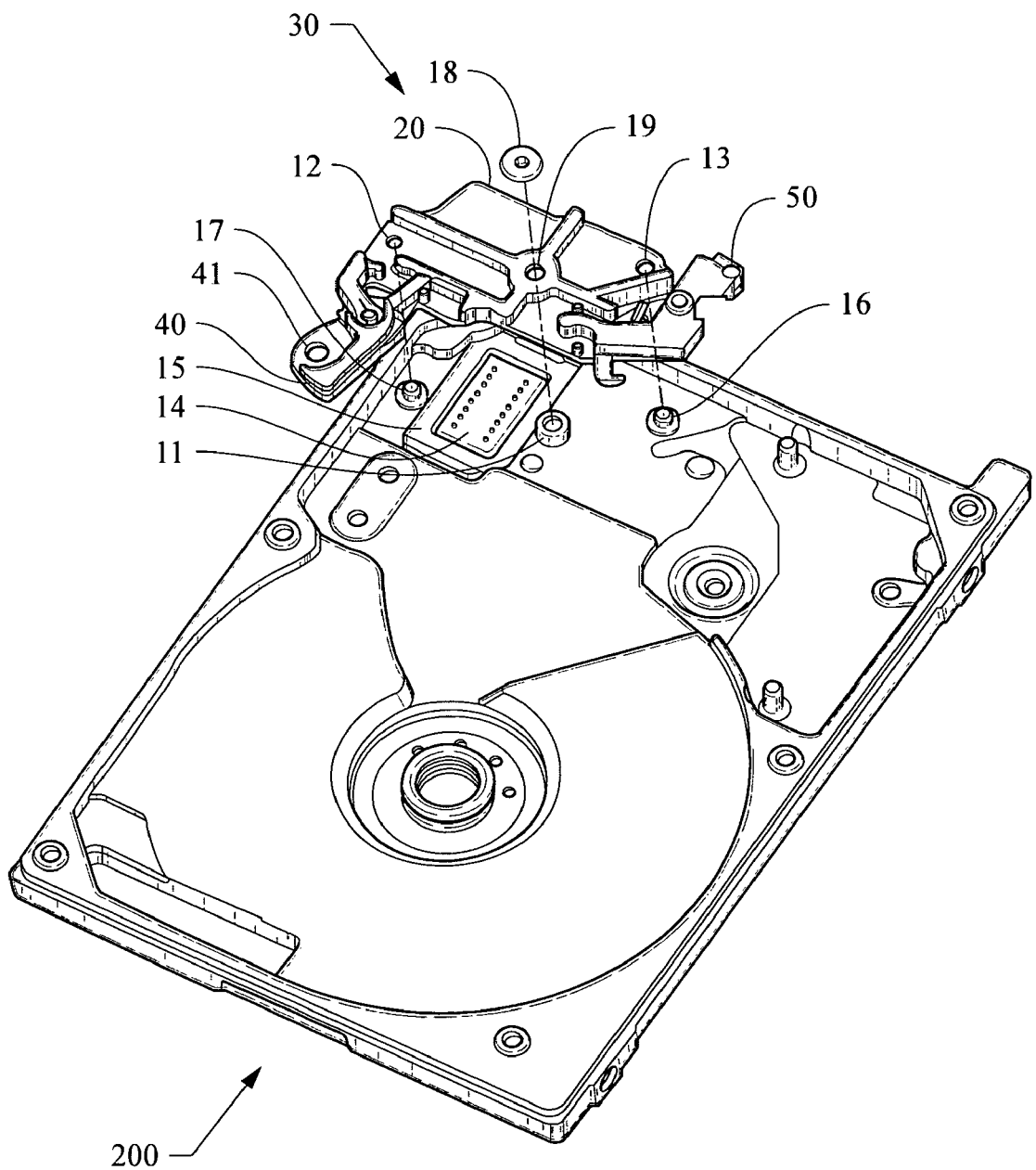
FIG. 2 is perspective view of a hard disk drive with an elevated view of a connector bracket assembly of the invention.

FIG. 2 illustrates a perspective top view of a hard disk drive 200 showing the top surface of a connector bracket assembly 30. The assembly includes a demountable ramp device 40 and a demountable latch member 50, of the invention. Assembly 30 is shown raised for clarity. The connector bracket 20 includes two alignment holes 12, 13 extending from the top to its bottom surface. The two alignment holes are positioned to fit over two locating pins 16, 17, protruding up from the base of the hard disk drive 200. The locating pins are used to position the bracket assembly 30 to compress gasket 15. The gasket surrounds connector 14. A flexible printed circuit (not shown) is used to tranfer data from the read/write head to the printed circuit board. The connector 14 electrically interconnects to a printed circuit board (not shown) that is mounted outside the sealed disc drive to a flexible printed circuit that is attached to the read/write heads inside the sealed disc drive. The connector bracket assembly 30 is demountably secured to base 200 with mounting screw 18 inserted through a clearance hole 19 centrally disposed through a rib section and fastened to the base by a threaded member 11 while compressing gasket 15.

Referring now to FIGS. 3, 4, 7 and 8 showing a perspective view of the connector bracket member 20 and top views of detailed features contained within the connector bracket. The bracket member is designed to minimize material mass yet providing a structured platform to increase mechanical strength and stability. The bracket includes mounting and rotating features for separately attaching and rotating the ramp device 40 during disc assembly. The purpose of rotation is to permit disc assembly space and means to secure the head slider during assembly. Ramp 40, shown in FIG. 4 snaps into a pair of flexure claw members 25, 26 disposed vertically are provided on bracket 20. The claw's openings 25b (best seen in a top view in FIGS. 7 and 8) flexes as a ramp snap post 42 is urged into the claw opening 25b forcing the flexure claw members to spread as the snap post is received into the claw. The interior diameter of the claw, having the same interior diameter as the snap post functions as a journal bearing for snap post 42 therein providing rotational freedom for the ramp. Rotation of the ramp member is limited by stop pins 24 and 27 limiting the ramp's extended member 43 between the two stop pins. Stop pin 27 is the ramp open position during the disc install position. A leaf spring 23 holds the ramp in that position. After the disks have been installed, the ramp 40 is rotated into place over the disc. Pin 24 locates the ramp "in place" position. The same leaf spring 23 keeps the ramp in place against stop pin 24 for fixedly securing the ramp by inserting a screw fastener in mounting hole 41, to secure the ramp to a threaded hole in the base of the hard drive (not shown.

Figure 4:
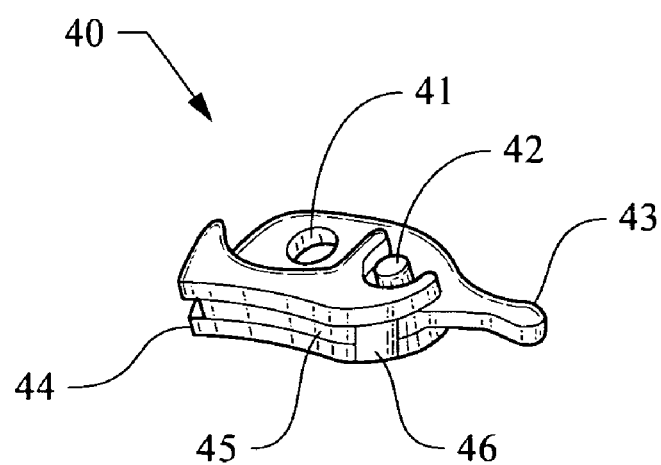
FIG. 4 is a perspective view of a ramp of the invention.

FIG. 4 illustrates a perspective view of the ramp body 40 showing three ramp positions for the head slider. Firstly, the head install position 46, secondly, the head park position 45 and thirdly, the head disk load position 44. Also shown, as previosly described, are clearance mounting hole 41, snap post 42, and extended member 43.

Figure 3:
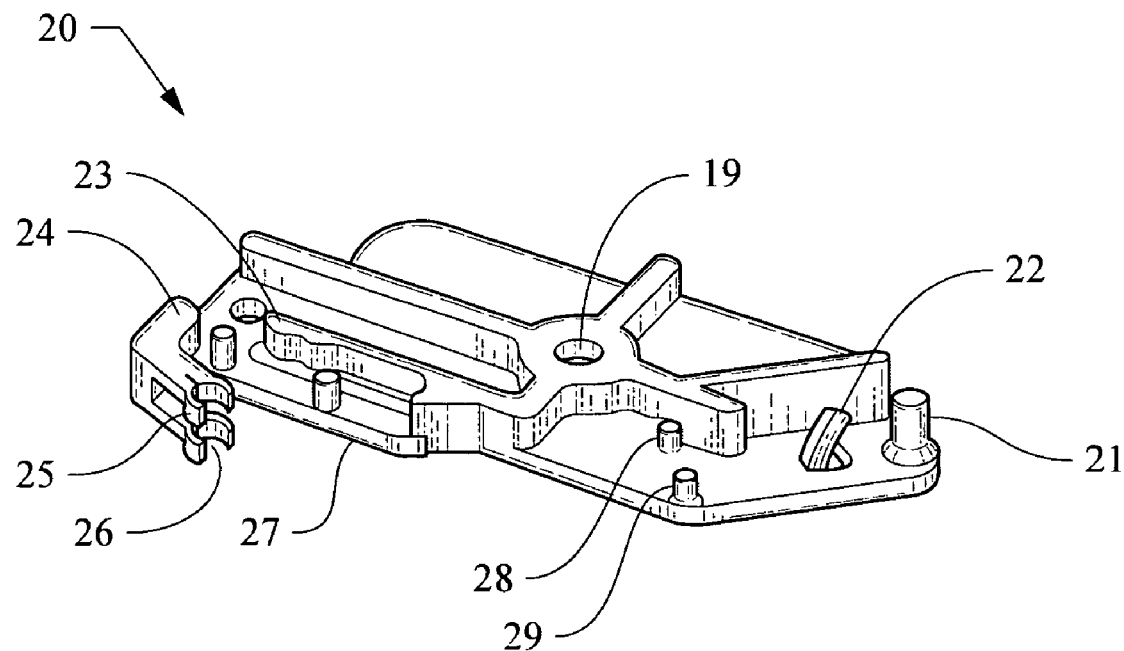
FIG. 3 is a perspective view of the connector bracket of the invention.
Figure 5:
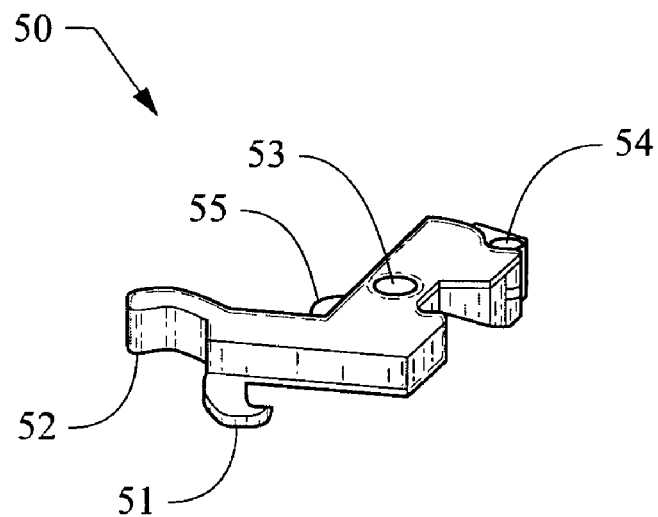
FIG. 5 is a perspective view of a latch of the invention.

The rotational inertia latch body 50 shown in FIG. 5 pivots on a post 21 in the connector bracket 20 shown in FIG. 3. The latch operates on the head side of the actuator, as opposed to the conventional mechanisms that operate on the coil side, a challenging design that incorporates both ramp and latch with the connector bracket as a single molded assembly providing a common reference relative to the head slider. Two latch locator pins molded into the connector bracket locate the open and closed latch positions.

The open position allows the actuator to rotate freely on and off the ramp, which allows the heads to fly on the spinning disc and access data. The closed position restricts the actuator from moving, keeping the heads on the ramp. The latch is always open unless there is a large rotational shock applied to the hard disc drive. Without the latch, a large rotational shock would cause the actuator and heads to move off the ramp. The heads could land on a non-spinning disc which will damage the drive. The inertia of the latch on a low friction pivot allows the latch to over come the magnetic return force and move to the closed position during a rotational shock event. Once the rotational shock event is over, the magnetic return will bring the latch back to the open position. Locator pin 29 is for the closed position and locator pin 28 is for the open position.

A snap feature 22 is provided in the bracket 20 to keep the latch from dislodging during assembly. The snap feature 22 is a flexure that bends out of the way when the latch is installed over post 21. When the latch is fully seated in the operating position the beam snaps back over the top of a shelf 55 in the latch. This shelf is below the beam and does not interfere with the latch rotation, but will limit the latch from sliding back up the post.

A magnetic return insert 54 is provided to return the latch The magnetic return slug is a cylinder of mild steel which is magnetically attracted to the stray flux coming from the edge of the VCM (voice coil motor) which moves the actuator assembly.

The rotational inertia latch pivots on a post in the connector bracket shown in FIG. 3. Rotation is limited by two pins molded into the bracket to locate the latch. Locator pin 28 is for the latch open position, and locator pin 29 is for the latch closed position. An ion the beam snaps back over the top of a shelf 55 in the latch 50. This shelf is below the beam and does not interfere with the latch rotation, but will limit the latch from sliding back up the post.

Figure 6:
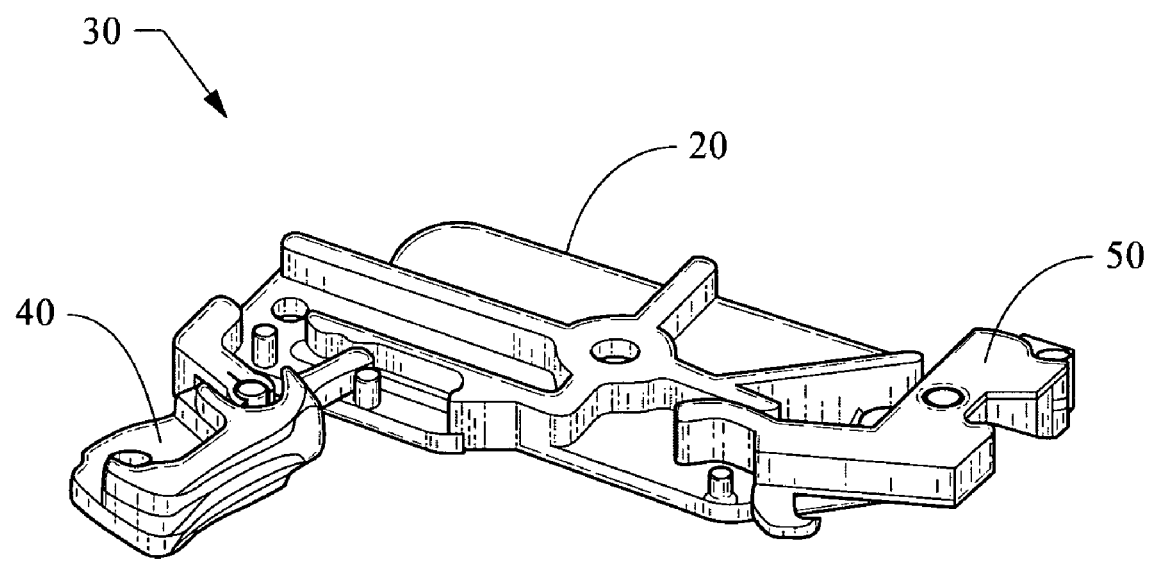
FIG. 6 is a perspective view of the connector bracket assembly of the invention.
Figure 7:
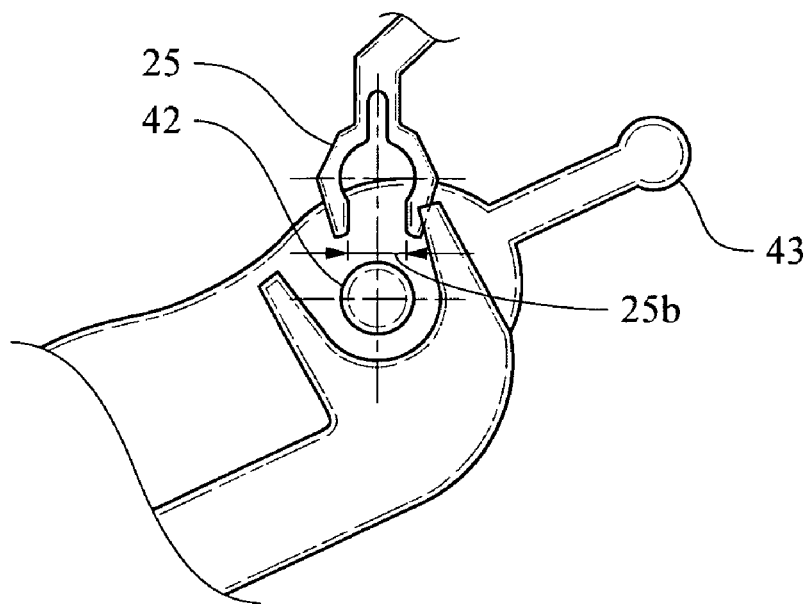
FIG. 7 is a top view of the ramp before snapping into claws of the invention.
Figure 8:
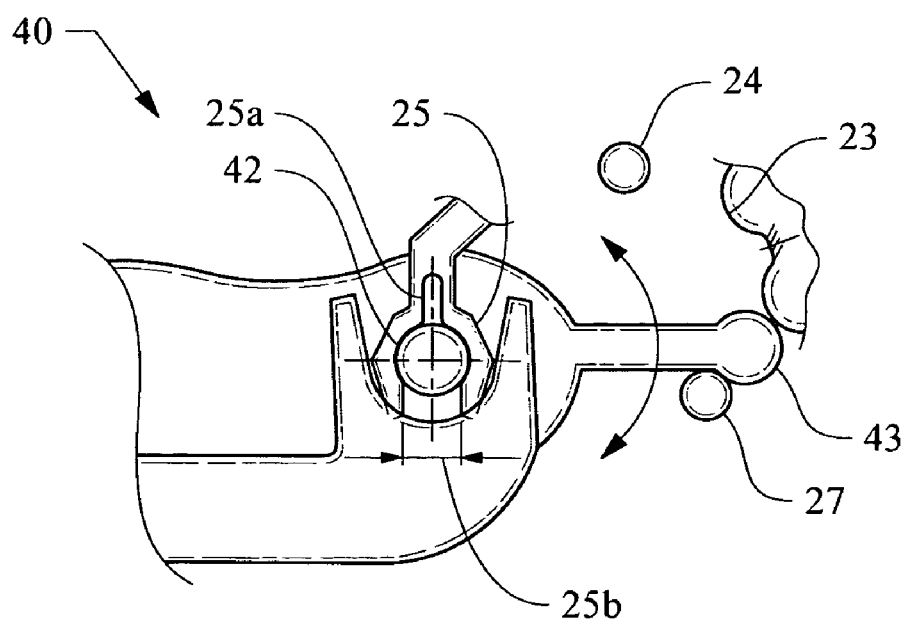
FIG. 8 is a top view of the ramp snapped into claws of the invention.

Referring now to FIG. 6 showing the connector bracket assembly 30 with connector bracket 20, ramp 40 and inertia latch 50. The connector bracket assembly performs three functions that can be pre-assembled off line and installed on the head disc assembly as shown in FIG. 2. This results in saving clean room space, time and cost.

In summary, a bracket assembly for a hard disc drives is described that includes a connector bracket having a top structured surface and a bottom planar surface. The top surface is used for demountably attaching a ramp arm with a ramp finger member, and an inertia latch arm. The bottom surface protects and seals electronic interconnection means for a flexible printed circuit used to transfer data from a read/write head to a printed circuit board disposed outside the hard disc drive. The connector bracket contains mounting, locating and stop features for the ramp and latch arms. The inertia latch arm operates on the head side of an actuator as opposed to a coil side.

Flexure claws are also included for receiving and retaining a ramp arm pivot post. The ramp arm rotates within the flexure claws limiting rotation between two stop pins disposed on the connector bracket by the finger member The first stop pin places the ramp arm for disc install while the second stop pin places the ramp arm over the disc in a final ramp position. A leaf spring urges and holds the ramp arm against a stop pin.

The connector bracket includes a pivot post for receiving a pivot bore of an inertia latch arm. The connector bracket has two pins for locating the latch arm in the open and closed latch positions, while a snap member in the bracket keeps the latch from dislodging during shipping and assembly.

While the invention has been particularly shown and described with reference to the preferred embodiments thereof, it will be understood by those skilled in the art that various changes in form and details may be made without departing from the spirit and scope of the invention.

What is claimed is:

1. A bracket assembly for hard disc drives, comprising:
   a connector bracket having a top structured surface and a bottom planar surface;
      said top surface used for demountably attaching a ramp arm with a protracted finger member and an inertia latch arm;
   said bottom surface protects and seals electronic interconnection means for a flexible printed circuit used to transfer data from a read/write head to a printed circuit board disposed outside said hard disc drive;
   said connector bracket contains mounting, locating and stops features for said ramp arm and said inertia latch arm;
   said inertia latch arm operates on a head side of an actuator as opposed to a coil side.

2. The bracket assembly of claim 1, wherein said connector bracket further comprises:
   flexure claws for receiving and retaining a ramp arm pivot post, said ramp arm rotates within said flexure claws, rotation of said ramp arm is limited between two stop pins disposed on said connector bracket in which rotation to a first of said two stop pins, places said ramp arm in a disc install position, and rotation to a second of said two stop pins, places said ramp arm over said disc in a final ramp position; a leaf spring urges and holds said ramp arm against a stop pin.

3. The bracket assembly of claim 2, wherein said leaf spring has two lobes each with a high point, in which angular movement of said ramp finger member depresses and passes said high point of said leaf spring, forcing said ramp finger against a respective stop pin.

4. The bracket assembly of claim 1, wherein said connector bracket further comprises:
   a pivot post for receiving a pivot bore of said inertia latch arm in;
   said connector bracket having two pins for locating said inertia latch arm in an open inertia latch arm position and a closed inertia latch arm position, and
   a snap member in said bracket that keep the inertia latch arm from dislodging during shipping and assembly.

5. The bracket assembly of claim 1, wherein said ramp arm with a protracted finger member has three ramp positions:
   a head install position;
   a head park position; and
   a head disc load position.

6. The bracket assembly of claim 1, wherein said ramp arm has a mounting hole for demountably fastening said ramp arm to the base of said hard disc drive.

7. The bracket assembly of claim 1, wherein said inertia latch arm has a magnetic insert for keeping said inertia latch arm in an open position by being attracted to stray magnetic flux from a nearby VCM, thereafter, if the disc drive receives a rotational shock, the inertia latch arm will overcome the magnetic attraction and rotate to a closed position, in the closed position the actuator is constrained by a latch hook preventing the head from leaving the ramp.

8. The bracket assembly of claim 1, wherein said connector bracket having means to secure and locate said ramp arm and inertia latch arm saves machining cost to the hard disc drive base.

9. The bracket assembly of claim 1, wherein one assembly includes three functions, ramp, latch and connector bracket, in which all can be assembled off line thereby reducing assembly time and make assembly tooling less complex.

10. The bracket assembly of claim 1, wherein a flexure claw has an inside diameter equal to a ramp arm pivot post.

11. The bracket assembly of claim 10, wherein said inside diameter of a closed flexure claw member functions as a journal bearing for said ramp arm pivot post.

12. The bracket assembly of claim 1, wherein said connector bracket has said top structured surface reinforced and defined with a ribbed cross-section.

13. The bracket assembly of claim 1, wherein said connector bracket is produced by molding.

14. A method of combining a ramp and latch with a connector bracket for a hard disc drive, comprising the steps of:
   molding a connector bracket having a top structured surface and a bottom planar surface;
   providing a ramp arm with a protracted finger, and demountable means for attaching said ramp arm to said top structured surface of said connector bracket;
   providing an inertia latch arm with demountable means for attaching said inertia latch arm to said top structured surface;
   protecting and sealing electronic interconnection means for a flexible printed circuit used for transferring data from a read/write head to a printed circuit board mounted outside a hard disc drive bottom surface;
   providing said connector bracket with mounting, locating and rotation limiting features for said ramp arm and said inertia latch arm;
   providing said inertia latch arm for operating on a head side of an actuator as opposed to a coil side.

15. The method according to claim 14, further comprises the steps of:
   providing flexure claws for a ramp arm pivot post; providing two stop pins disposed on said connector bracket, in which a first stop pin limits rotation of said ramp arm in position for installing a disc, after installing said disc, said ramp arm is rotated against a second stop pin placing said ramp arm in a final ramp position;
   providing a leaf spring for urging and holding said ramp arm against each of said two stop pins.

16. The method according to claim 14, further comprises the steps of:
   providing a pivot post for receiving an inertia latch arm pivot bore;
   providing two pins for locating said inertia latch arm in an open latch position and a closed latch position;
   providing a snap member in said bracket for keeping the latch from dislodging during shipping and assembly.

17. The method according to claim 14 wherein said ramp arm with a protracted finger member has several ramp positions:
   a head installing position;
   a head parking position;
   a head loading position, and
   a head disc load position.

18. The method according to claim 14, wherein said ramp arm provides a mounting hole for demountably fastening said ramp arm to the base of said hard disc drive.

19. The method according to claim 14, wherein said inertia latch arm has a magnetic insert to keep the inertia latch arm in an open position by being attracted to the stray magnetic flux of the nearby VCM, so that, when said disc drive receives a rotational shock, said inertia latch arm will over-come said stray magnetic flux attraction and rotate to a closed position, said actuator is constrained by a latch hook preventing the heads from leaving said ramp arm.

20. The method according to claim 14, wherein said connector bracket provides means for securing and locating said ramp arm and inertia latch arm to save machining cost to the hard disc drive base.

21. The method according to claim 14, wherein one assembly combines three procedures involving said ramp arm, inertia latch arm and connector bracket, assembled off line thereby reducing assembly time and making procedures for assembly less complex.

* * * * *